No. 835,842. PATENTED NOV. 13, 1906.
I. D. WEAVER.
MACHINE FOR WELDING AND SHAPING CHAIN LINKS.
APPLICATION FILED FEB. 26, 1906.
3 SHEETS—SHEET 1.
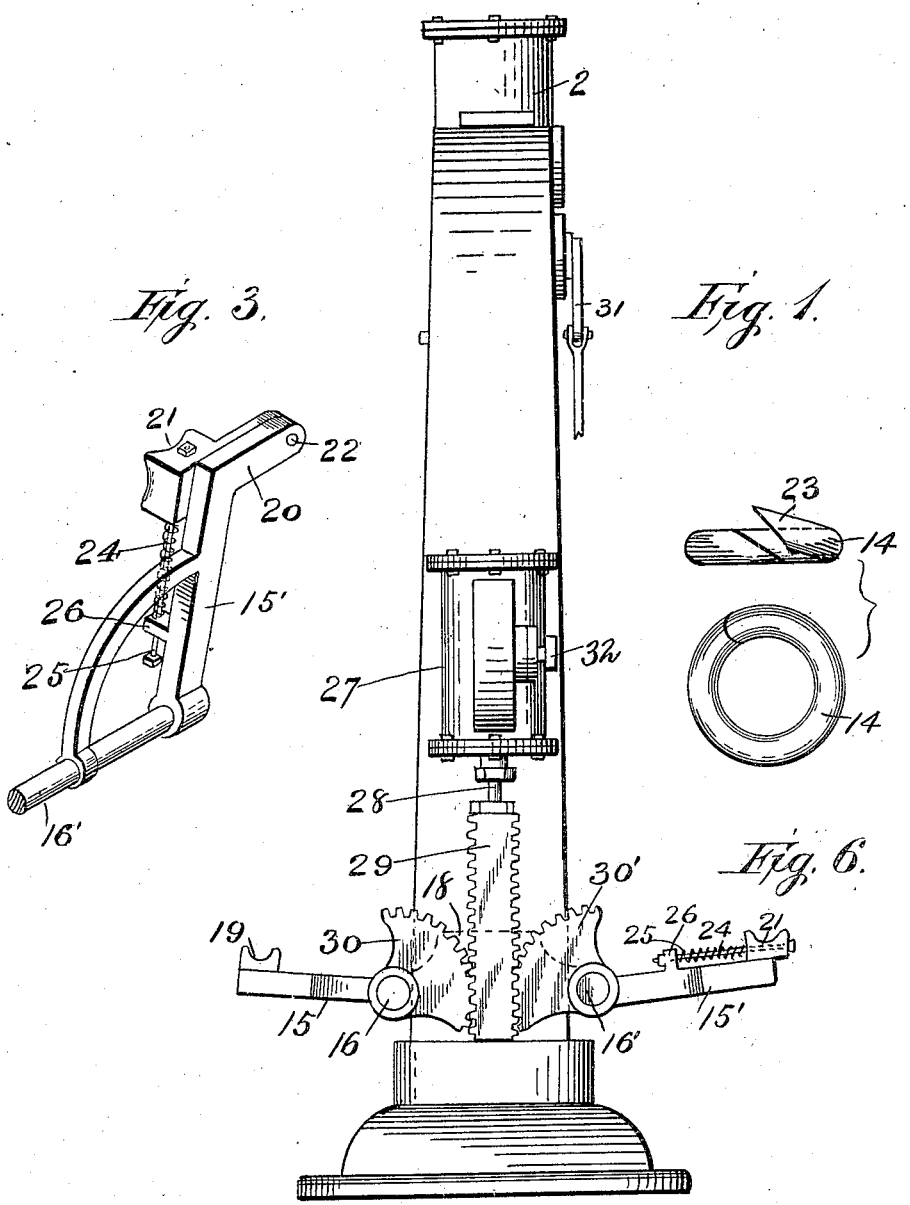
WITNESSES:
INVENTOR
Isaac D. Weaver
By D. P. Reinohl
Attorney No. 835,842. PATENTED NOV. 13, 1906.
I. D. WEAVER.
MACHINE FOR WELDING AND SHAPING CHAIN LINKS.
APPLICATION FILED FEB. 26, 1906.
3 SHEETS—SHEET 2.
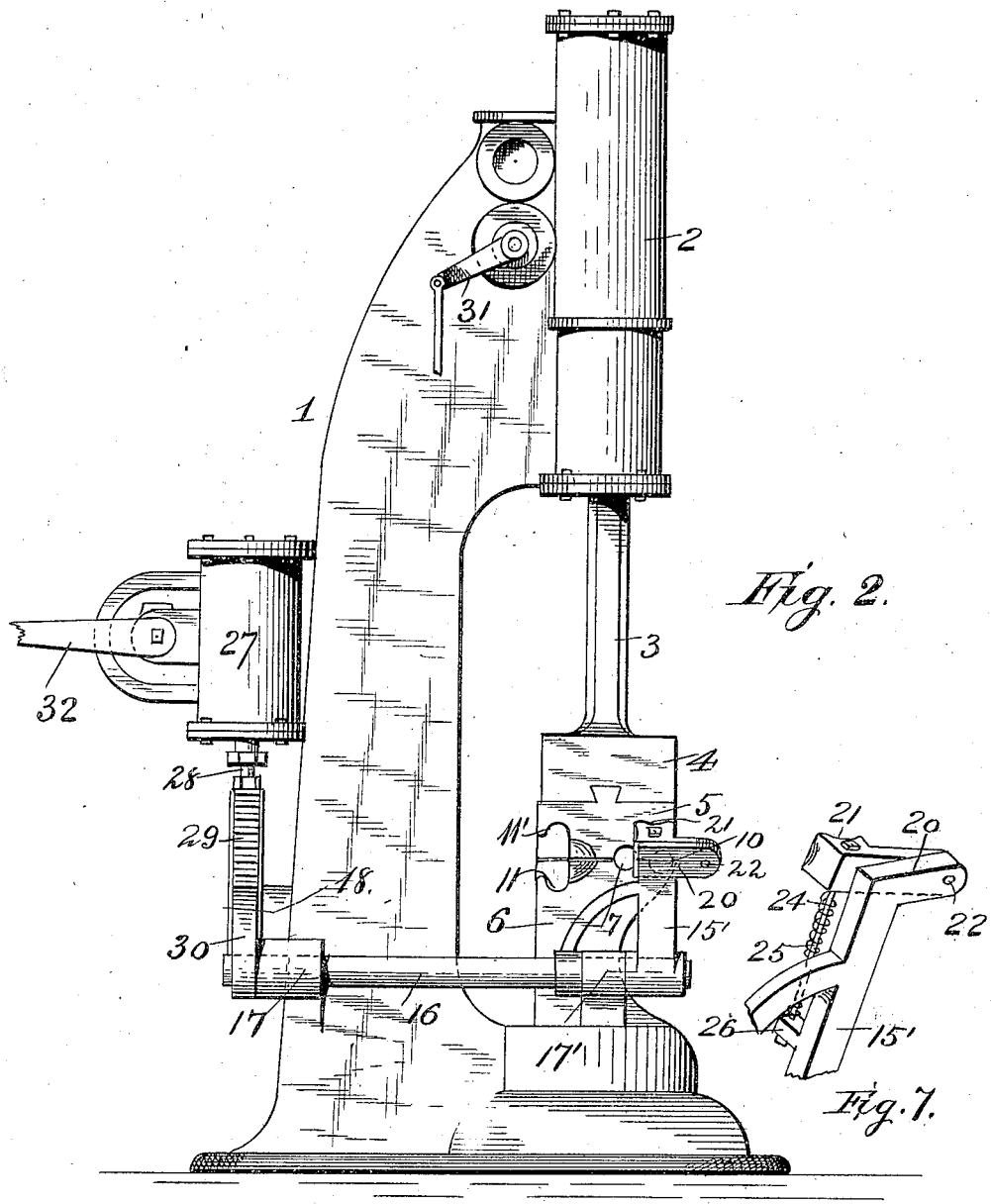

No. 835,842. PATENTED NOV. 13, 1906.
I. D. WEAVER.
MACHINE FOR WELDING AND SHAPING CHAIN LINKS.
APPLICATION FILED FEB. 26, 1906.
3 SHEETS—SHEET 3.
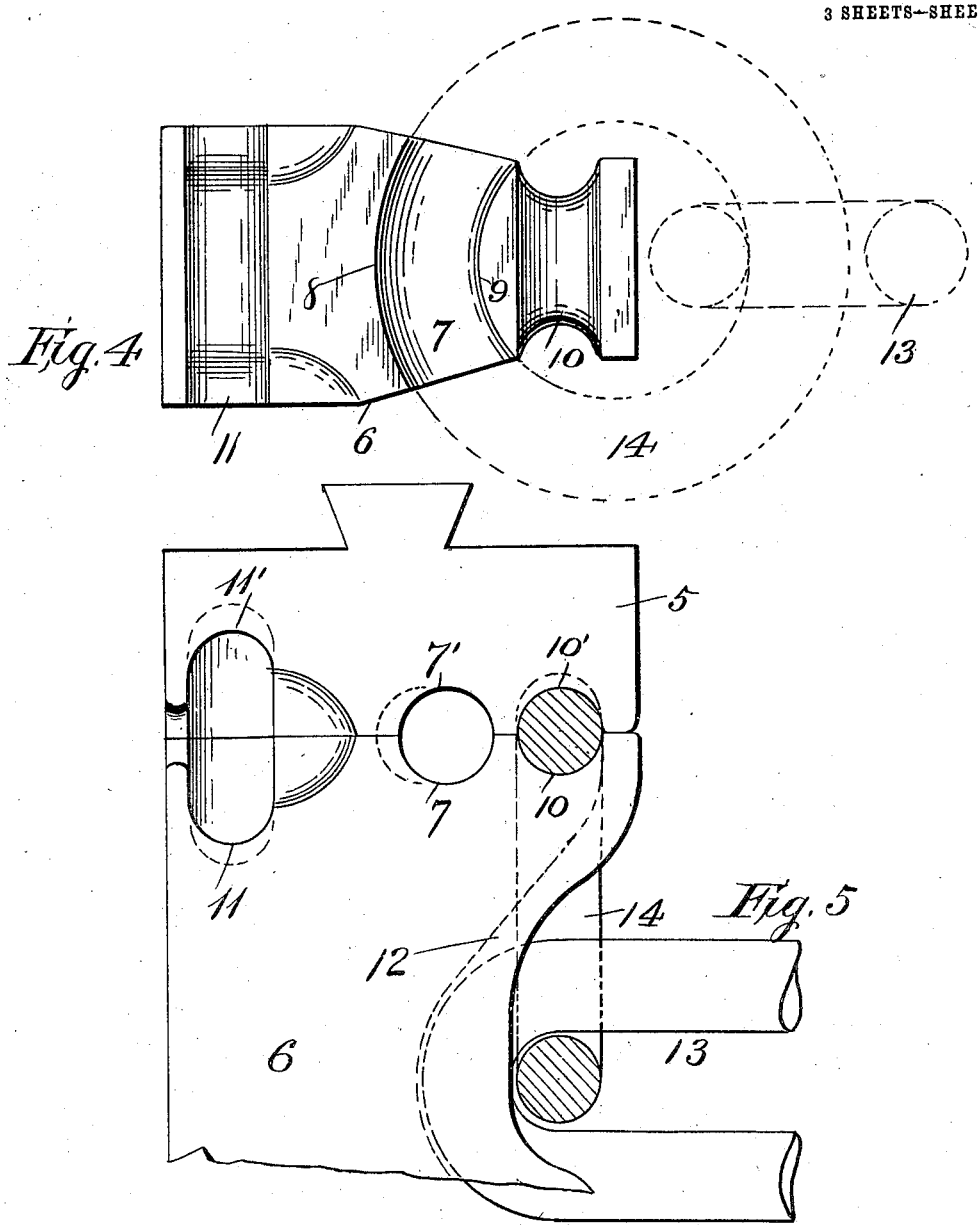
WITNESSES:
INVENTOR
BY
Attorney

UNITED STATES PATENT OFFICE.

ISAAC D. WEAVER, OF LEBANON, PENNSYLVANIA, ASSIGNOR, BY MESNE ASSIGNMENTS, TO HERCULES CHAIN COMPANY, OF LEBANON, PENNSYLVANIA, A CORPORATION OF PENNSYLVANIA.

MACHINE FOR WELDING AND SHAPING CHAIN-LINKS.

No. 835,842.              Specification of Letters Patent.           Patented Nov. 13, 1906.

Application filed February 26, 1906. Serial No. 303,074.

*To all whom it may concern:*

Be it known that I, ISAAC D. WEAVER, a citizen of the United States, residing at Lebanon, in the county of Lebanon and State of Pennsylvania, have invented certain new and useful Improvements in Machines for Welding and Shaping Chain-Links; and I do hereby declare the following to be a full, clear, and exact description of the invention, such as will enable others skilled in the art to which it appertains to make and use the same.

My invention relates to the manufacture of chain, and has especial reference to the welding and shaping of the links composing a chain, whereby all the links are perfectly welded and are of uniform dimensions.

The invention has for its object economy in time and labor, and consequent cost and the production of chain of great strength and durability; and the invention consists in certain improvements which will be fully disclosed in the following specification and claims.

In the accompanying drawings, which form part of this specification, Figure 1 represents a rear elevation of a machine embodying my invention; Fig. 2, a side elevation of the same; Fig. 3, a perspective of one of the clamping-blocks depressed and its supporting-arm; Fig. 4, a plan view of the lower or fixed die, showing a link-blank in the welding-cavity and on an enlarged scale; Fig. 5, a side elevation of the dies, showing a welded link in the rounding or finishing cavity of the dies; Fig. 6, an end view and a top plan view of a link-blank, and Fig. 7 a perspective of the same clamping-block in its elevated or normal position.

Reference being had to the drawings and the designating characters thereon, the numeral 1 indicates a hammer of any approved form provided with my improvements. 2 is the cylinder of such a hammer, having a rod 3 and a head 4, to which the top or upper die 5 is secured in any approved manner.

6 is the lower and fixed die and is provided in its face, adjacent to the face of the upper die, with a welding cavity or groove 7, whose walls 8 and 9 are curved longitudinally of the groove and transversely of the die to correspond with the lines of the outside and the inside of the link-blank, and the opposite or transverse curve of the groove corresponds with the diameter of the metal forming the link-blank, and in which groove the link-blank lies in horizontal position, as shown in dotted lines in Fig. 4, while the scarfed ends of the blank are being welded. In front of the groove 7 is a groove 10, transverse of the die and whose walls correspond with the inner side of the link-blank and the diameter of the metal and in which the blank is placed to hang vertically, as shown in Fig. 5, while the welded portion is rounded or finished. 11 is a link forming or shaping groove or cavity which has the contour of one side of a completed link extending the length of the groove, and transversely the groove corresponds with the diameter of the metal of which the link is made.

12 is a cavity in the front of the lower die to receive the end of the link 13 in the link-blank 14, suspended in the groove 10 of the die.

The grooves in the upper die 5 correspond with the grooves in the lower die and are designated, respectively, 7', 10', and 11'.

15 15' indicate arms secured on shafts 16 16', which are supported in suitable bearings 17 17' on each side of the frame of the hammer. The bearings 17 are formed on a lug 18 integral with or secured to the rear face of the frame and extend beyond the sides thereof. On the arm 15 is a fixed clamping-block 19, and on the arm 15' is a lug 20, on which is a like clamping-block 21, pivotally secured at 22. The working face of each block is the contour of the outside of the link-blank 14—that is, it is curved longitudinally to correspond with the outside of the blank and transversely to correspond with the contour of the metal and clamp the blank while the ends thereof are being welded.

The upper end 23 of the link-blank being higher than the adjacent end of the blank as it lies in the welding-groove 7, the arm 15' of the clamping-block 21 is a little longer than the arm 15 on the opposite side, and the clamping-block 21 is normally elevated by a spring 24 on a bolt 25, which extends through said clamping-block and through a lug 26 on the face of the arm 15'. The arms 15 15', with their clamping-blocks 19 and 21, are moved laterally into position to engage the link-blank 14 when placed in the welding-groove 7 by a motor 27, having on its rod 28 a rack 29, provided on opposite sides with teeth which engage the teeth of sector-shaped gears 30 30'. The clamping-blocks are designed to be raised and projected against the link-blank with sufficient force to drive the ends of the blank inward and cause them to more than overlap to afford sufficient metal to produce a perfect weld without reducing the thickness of the metal at the point of the weld and maintain the maximum strength of the link throughout its entire body. The valve of the cylinder 2 and the valve of the motor 27 are operated, respectively, by levers 31 and 32 in the usual manner.

The operation is as follows: A link-blank after having been properly heated is placed horizontally in the groove 7 of the lower die, with the scarfed ends of the blank lying in or over the groove. The hammer is then operated to force the free or scarfed ends toward each other, when the clamping-blocks 19 and 21 are applied to the opposite sides of the blank, the ends driven in toward each other to make them overlap to supply sufficient metal to effect a perfect welded joint without reducing the diameter of the link at the point of the weld. The upper die is then forced down with sufficient power to weld the scarfed ends of the blank, and the clamping-block 21 in engagement with the high part of the link-blank is forced down with it as the weld is formed. The weld having been formed, the clamping-blocks are disengaged from the link-blank and thrown down in the position shown in Fig. 1. The link-blank is then raised out of the groove 7 and placed in the groove 10, in which it hangs vertically, and the welded part rounded or finished by the corresponding groove 10' in the upper die. The blank is then placed in the shaping or forming groove 11 of the lower die, the stud inserted, and the upper die brought down upon it until the upper side of the link rests in the concave end of the stud, when the link is completed. The welding and the shaping of the link-blank may be effected under one heating of the metal, and in practice two heating-furnaces can be utilized to furnish heated link-blanks for one machine and one gang of men.

Having thus fully described my invention, what I claim is—

1. In a device for welding chain, a fixed die having a welding-groove, a movable die having a like groove, and clamping-blocks for engaging opposite sides of a link-blank, one of which blocks is vertically movable.

2. In a device for welding chain, a fixed die having a welding-groove, a movable die having a like groove, and a pair of laterally-movable arms provided with clamping-blocks, one of which blocks is yieldingly attached to the arm.

3. In a device for welding chain, a fixed die having a welding-groove, a movable die having a like groove, and a pair of laterally-movable arms provided with clamping-blocks to engage opposite sides of a link-blank, one of which blocks is vertically movable on its arm, and means for automatically restoring said block to it normal position.

4. In a device for welding chain, a fixed die having a welding-groove, a movable die having a like groove, a pair of laterally-movable arms on opposite sides of the grooves in the dies and provided with clamping-blocks, shafts supporting said arms, a sector-shaped gear on each of said shafts, and a rack for operating said gear.

5. In a device for welding chain, a fixed die having a welding-groove to support a link-blank in horizontal position, a movable die having a like groove, a pair of laterally-movable arms of different lengths on opposite sides of the grooves in the die and provided with clamping-blocks, the block on the long arm being movable, a motor, and intermediate connections for operating said arms and clamping-blocks.

In testimony whereof I affix my signature in presence of two witnesses.

ISAAC D. WEAVER.

Witnesses:
NORMAN PEFFLUS,
HARRY RISSER.